(12) United States Patent
Harsha et al.

(10) Patent No.: US 9,760,531 B2
(45) Date of Patent: *Sep. 12, 2017

(54) METHOD, APPARATUS, AND COMPUTER-READABLE MEDIUM FOR PARALLELIZATION OF A COMPUTER PROGRAM ON A PLURALITY OF COMPUTING CORES

(71) Applicant: CORNAMI, INC., Santa Clara, CA (US)

(72) Inventors: Solomon Harsha, Los Gatos, CA (US); Paul Master, Sunnyvale, CA (US)

(73) Assignee: CORNAMI, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,412

(22) Filed: Apr. 6, 2017

(65) Prior Publication Data
US 2017/0212866 A1    Jul. 27, 2017

Related U.S. Application Data

(63) Continuation of application No. 15/296,681, filed on Oct. 18, 2016, which is a continuation of application No. 14/483,086, filed on Sep. 10, 2014, now Pat. No. 9,501,449.

(60) Provisional application No. 61/877,267, filed on Sep. 12, 2013, provisional application No. 61/876,213, filed on Sep. 10, 2013.

(51) Int. Cl.
*G06F 15/80* (2006.01)
*G06Q 40/00* (2012.01)
*G06F 9/45* (2006.01)

(52) U.S. Cl.
CPC ............ *G06F 15/8046* (2013.01); *G06F 8/45* (2013.01); *G06Q 40/00* (2013.01)

(58) Field of Classification Search
CPC ........ G06F 8/45; G06F 15/8046; G06Q 40/00
See application file for complete search history.

(56) References Cited

U.S. PATENT DOCUMENTS 5,355,492 A * 10/1994 Frankel .................. G06F 8/427
                                                       712/22
5,870,608 A *  2/1999 Gregory ................ G06F 17/211
                                                       717/131

(Continued)

*Primary Examiner* — Arvin Eskandarnia
*Assistant Examiner* — Gil H. Lee
(74) *Attorney, Agent, or Firm* — Rimon, P.C.; Marc Kaufman

(57) ABSTRACT

An apparatus, computer-readable medium, and computer-implemented method for parallelization of a computer program on a plurality of computing cores includes receiving a computer program comprising a plurality of commands, decomposing the plurality of commands into a plurality of node networks, each node network corresponding to a command in the plurality of commands and including one or more nodes corresponding to execution dependencies of the command, mapping the plurality of node networks to a plurality of systolic arrays, each systolic array comprising a plurality of cells and each non-data node in each node network being mapped to a cell in the plurality of cells, and mapping each cell in each systolic array to a computing core in the plurality of computing cores.

10 Claims, 18 Drawing Sheets

(56) References Cited

U.S. PATENT DOCUMENTS

| | | | |
|---|---|---|---|
| 8,416,841 B1* | 4/2013 | Tarn | H04L 25/03159 375/224 |
| 2004/0015487 A1* | 1/2004 | Lin | G06F 17/30448 |
| 2009/0240917 A1* | 9/2009 | Fitton | G06F 17/16 712/36 |

* cited by examiner

METHOD, APPARATUS, AND COMPUTER-READABLE MEDIUM FOR PARALLELIZATION OF A COMPUTER PROGRAM ON A PLURALITY OF COMPUTING CORES

RELATED APPLICATION DATA

This application is a continuation of U.S. application Ser. No. 15/296,681 filed on Oct. 18, 2016, which is a continuation of U.S. application Ser. No. 14/483,086, filed Sep. 10, 2014, which claims priority to U.S. Provisional Application No. 61/876,213, filed Sep. 10, 2013 and U.S. Provisional Application No. 61/877,267, filed Sep. 12, 2013, the disclosures of which are hereby incorporated by reference in their entirety.

BACKGROUND

Parallel computing uses multiple processing elements simultaneously to solve a problem. The typical types of parallelism can include bit level parallelism to instruction level and on to task level. These are accomplished by breaking the problem into independent parts so that each processing element can execute its part of the algorithm simultaneously with the others. The processing elements can be diverse and include resources such as a single computer with multiple processors, several networked computers, specialized hardware, or any combination of the above.

One method of parallelization involves systolic arrays. A systolic array is an arrangement of processors in an array where data flows synchronously across the array between neighbors, usually with different data flowing in different directions. Each processor at each step takes in data from one or more neighbors (e.g. North and West), processes it and, in the next step, outputs results in another direction (e.g., South and East).

Systolic algorithms are a form of pipelining, sometimes in more than one dimension. In these algorithms, data flows from a memory in a rhythmic fashion, passing through many processing elements before it returns to memory. Systolic arrays provide extremely fast computing on multi-core processors with scalable architecture and can turn many exponential problems into linear or polynomial time problems, but they are very difficult to implement and build.

Multi-core processing elements exist on the same chip and can issue multiple instructions per cycle from multiple instruction streams. Of the multi-core chips available today, field-programmable gate arrays (FPGAs) can be used to create hundreds of cores on them which can be used for multi-core parallel computing.

FGPAs are an example of reconfigurable computing. Reconfigurable computing is a computer architecture which combines some of the flexibility of software with the high performance of hardware by processing with very flexible high speed computing fabrics. The principal difference when compared to using ordinary general microprocessors (GPs) is the ability to make substantial changes to the data-path itself in addition to the control flow. On the other hand, the main difference with custom hardware such as application-specific integrated circuits (ASICs) is the option to adapt the hardware during runtime by "loading" a new circuit on the reconfigurable fabric.

Hardware description languages (HDL) are used to program the structure, design and operation of FPGAs and other electronic circuits. However, programming in these languages can be tedious. As a result, several vendors have created C to HDL languages that attempt to emulate the syntax and semantics of the C programming language, with which most programmers are familiar. The best-known C to HDL languages are Mitrion-C, Impulse C, DIME-C, and Handel-C. Specific subsets of System C based on C++ can also be used for this purpose. However, these languages cannot use cores optimally and cannot be programmed for effective performance. As a result, FPGAs are largely used as co-processors to a general purpose computer to solve a portion of the large computations such as matrix multiplications, N-body problems, etc., but are not used as a general purpose computer to run full-blown applications.

More recently, FPGAs have been programmed using systolic arrays for data-flow computing to solve small compute intensive sub-tasks as mentioned above, but only with hardware description languages such as Verilog or VHDL. Since these hardware description languages are difficult to implement and build, these solutions cannot be used for general purpose programming.

DETAILED DESCRIPTION

While methods, apparatuses, and computer-readable media are described herein by way of examples and embodiments, those skilled in the art recognize that methods, apparatuses, and computer-readable media for parallelization of a computer program on a plurality of computing cores are not limited to the embodiments or drawings described. It should be understood that the drawings and description are not intended to be limited to the particular form disclosed. Rather, the intention is to cover all modifications, equivalents and alternatives falling within the spirit and scope of the disclosure. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

The Applicants have discovered a method and system for using dynamic systolic array networks to program FPGA multi-core processors. With this system and method, FPGAs can be used as a general-purpose computer to run any typical program written in a conventional programming language such as C or C++ or any interpreted language such as Matlab or Python. The system and method enables compilation, linking, and running of the program without the burden of an operating system (OS) through the use of systolic parallelism.

The present system and method enables low latency execution of applications, such as trading applications, which are frequently time-sensitive. Existing computer languages, including command interpreted languages, are not designed to take advantage of multi-core optimization i.e. they cannot be parallelized on multiple cores to achieve trading decisions (Pricing/Risk-Management/Hedging/Speculation/Arbitraging) at wire-speeds. The disclosed system and method minimize processing time for such applications without compromising on the advantages of dynamic binding of modules at run time and allow trading decisions to be achieved at wire speeds. Underlying financial applications processed using the disclosed system and method can perform quantitative methods such as derivative contracts pricing and dynamic hedging with other financial instruments at wire speeds.

Figure 1:
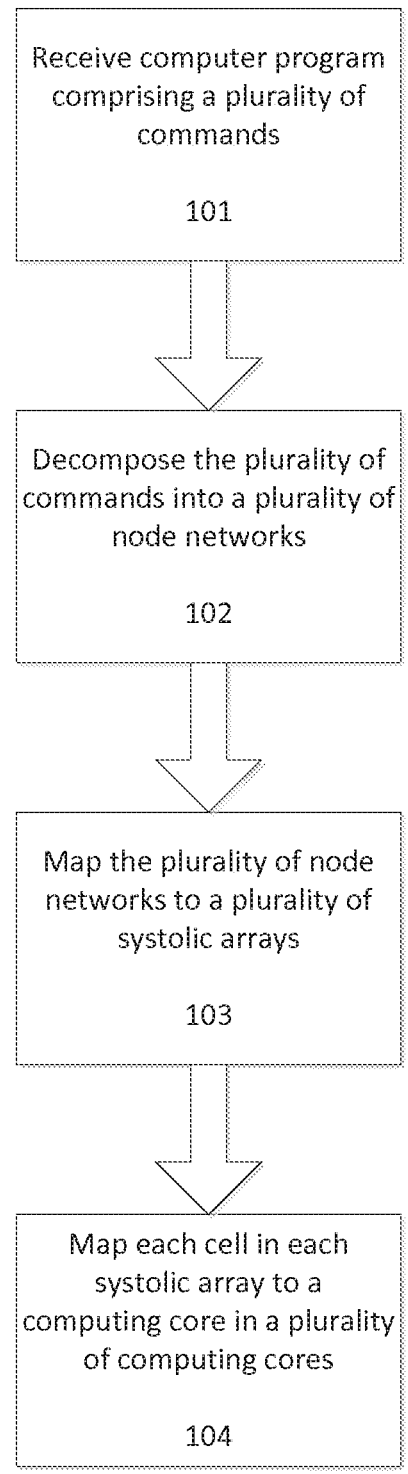
FIG. 1 illustrates a flowchart for parallelization of a computer program on a plurality of computing cores according to an exemplary embodiment.

FIG. 1 is flowchart showing an overview of a method of parallelization of a computer program on a plurality of computing cores according to an exemplary embodiment. Each of these steps will be described in greater detail with reference to the remaining figures.

At step 101 a computer program comprising a plurality of commands is received. The computer program can be any language or syntax, including interpreted and/or command line languages such as C, C++, JAVA, Matlab, Maple, and/or Python. Of course, the computer program can also be a single line program, such as a single command in Matlab. The commands can include, for example, definitions, functions, function calls, assignments, statements, and/or operations corresponding to one or more lines of code in the program.

Figure 2:
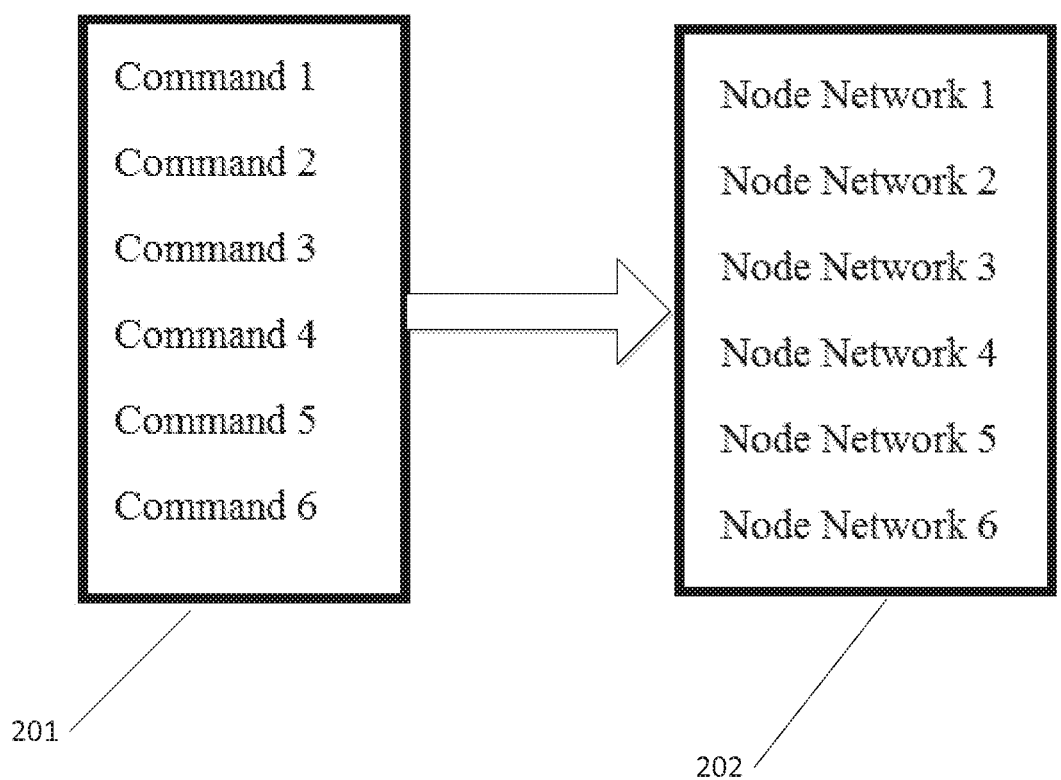
FIG. 2 shows the mapping of commands in a program to node networks according to an exemplary embodiment.

At step 102 the plurality of commands are decomposed into a plurality of node networks, wherein each node network corresponds to a command in the plurality of commands and includes one or more nodes corresponding to execution dependencies of the command. For example, FIG. 2 illustrates a program 201 having six commands. As shown in the figure, six node networks 202 are generated corresponding to each of the six commands.

Optionally, pre-processing can be performed on computer program prior to decomposing the plurality of commands into a plurality of node networks. For example, if the computer program includes a loop that is configured to executed for a set number of iterations, such as a for loop, then the loop can be unrolled to generate additional commands corresponding to each iteration and the loop language can be removed. For example, the following code:

int x=3;
for (int i=0; i<5; i++)
x++;
Can be transformed to:
int x=3;
x++;
x++;
x++;
x++;
x++;

In this case, the additional commands generated in the process of unrolling the loop would be considered part of the plurality of commands and would be decomposed into a plurality of node networks as well.

At step 103 the plurality of node networks are mapped to a plurality of systolic arrays, wherein each systolic array comprises a plurality of cells and wherein each non-data node in each node network is mapped to a cell in the plurality of cells. At step 104 each cell in each systolic array is mapped to a computing core in the plurality of computing cores.

Figure 3:
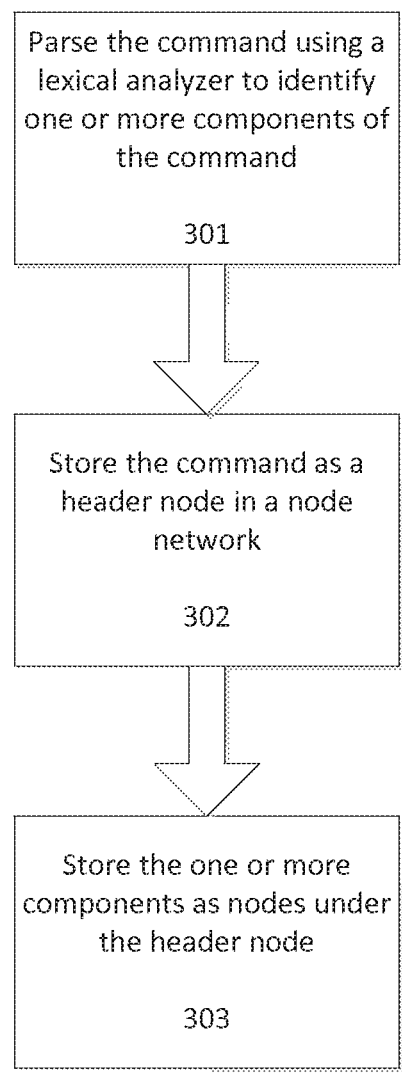
FIG. 3 illustrates a flowchart for decomposing a command into a node network according to an exemplary embodiment.

The process for decomposing the plurality of commands into a plurality of node networks will now be described in greater detail. FIG. 3 is flowchart showing a method for decomposing a single command in the plurality of commands into a node network according to an exemplary embodiment. The steps illustrated in FIG. 3 can be performed for each of the commands in the plurality of commands which make up the computer program.

At step 301, the command is parsed using a lexical analyzer to identify one or more components of the command. The one or more components can include any part of the command, such as sub-commands within the command, variables, and data values which are part of the command. Sub-commands can include any function calls or other operations which are not simple read/write or arithmetic operations.

The lexical analyzer can itself be implemented in hardware by one or more systolic arrays corresponding to the grammar and syntax of the language in which the computer program is written. For example, one or more systolic arrays can be created from an FPGA based on a language definition file which corresponds to a programming language of the computer program and which defines a grammar and syntax of the programming language. For example, the language definition file can specify how a function call is made in the particular programming language or how a new variable is instantiated in the particular programming language. The one or more systolic arrays can then be used as a hardware-based lexical analyzer and a Just-In-Time (JIT) compiler. By implementing the parsing and interpreting functionality in hardware, the system can perform real-time parsing of the commands in the computer program. Alternatively, the lexical analyzer can be software based.

At step 302, the command is stored as a header node in a node network corresponding to the command. A node network can be created for each command in the plurality of commands and each command can be stored as the header node for the corresponding node network.

At step 303, the one or more components identified in step 301 are stored as nodes under the header node. The storage of the one or more components as nodes under the header nodes reflects the execution dependencies of the command, in that the one or more components must be evaluated prior to the command being evaluated.

Figure 4:
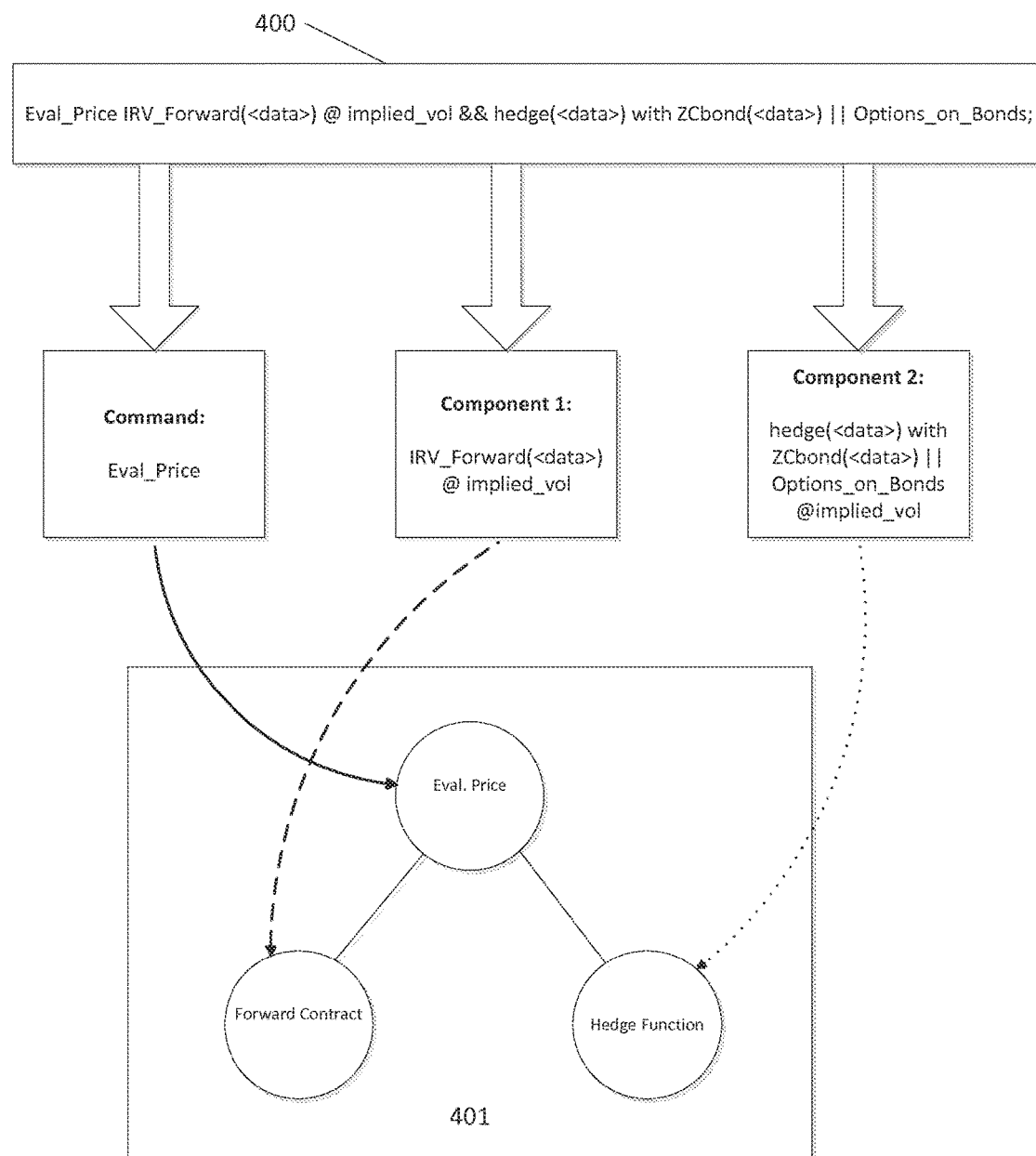
FIG. 4 is a diagram illustrating node network generation according to an exemplary embodiment.

FIG. 4 illustrates this node network generation process according to an exemplary embodiment. Command 400 is a Matlab command to evaluate a price position for a forward contract at an implied volatility and hedged based on possible bond valuations.

As shown in the figure, the components of the command 400 include a forward contract function and a hedge function. Accordingly the node network 401 corresponding to the command 400 includes the evaluate price command as a header node and the components of the forward contract function component and the hedge function component as nodes below the header node. Node networks can be stored in any suitable format. For example, node networks can be stored as trees.

The components identified in any given command will depend on the programming language and the syntax and grammar of the language as parsed by the lexical analyzer. In this case, the lexical analyzer would be equipped to recognize each of these components based on the grammar of the particular function calls, including operands, and operators between the function calls. A simpler example in C++ would be the command: "float result=b+sqrt(c);" In this case, the command would be "result" and the components would be "b" and "sqrt(c)."

Figure 5:
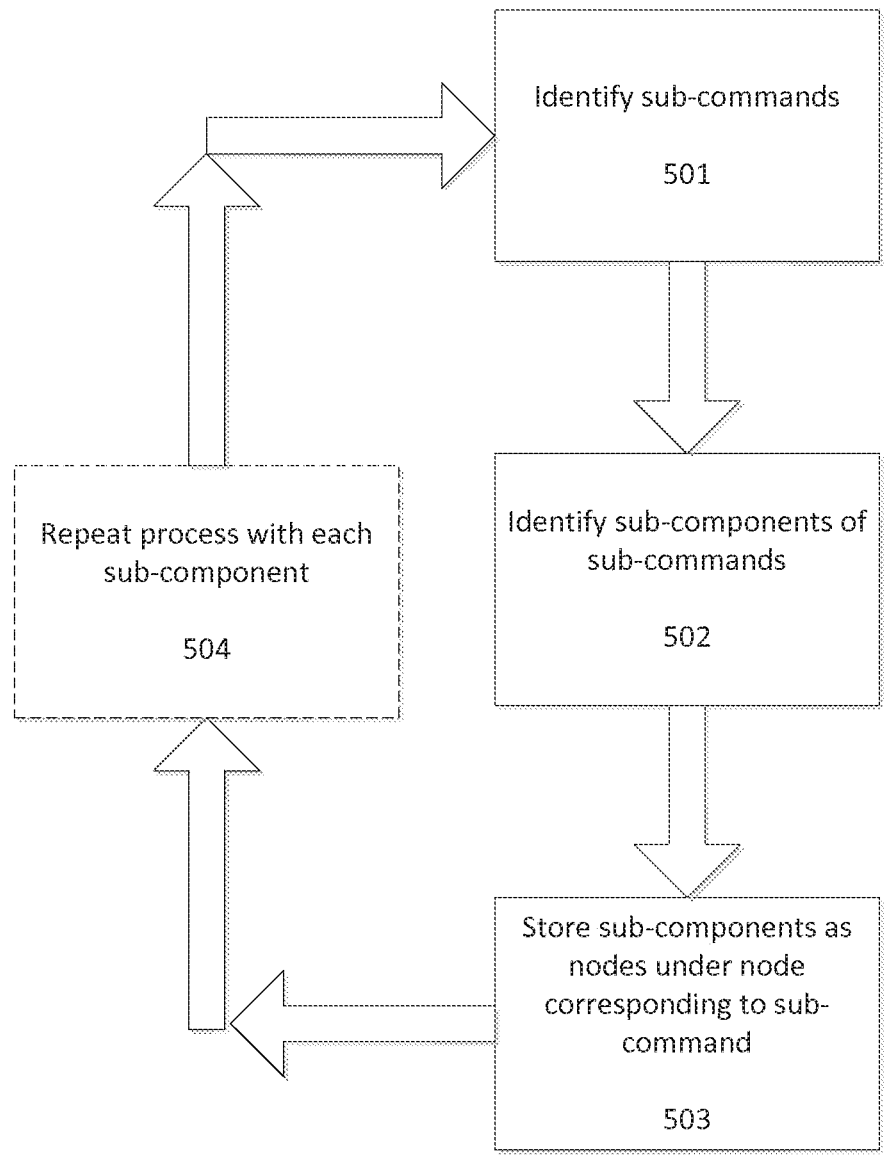
FIG. 5 illustrates a flowchart for decomposing sub-components of a sub-command into the node network according to an exemplary embodiment.

The decomposition of the command is not necessarily complete after the steps in FIG. 3. FIG. 5 illustrates a flowchart for decomposing sub-components of a sub-command and adding them to the node network according to an exemplary embodiment.

At step 501, one or more sub-commands are identified. Initially, one or more sub-commands in the one or more components of the command can be identified. As discussed earlier, sub-commands can include any additional commands which are part of the command. For example, any function calls made in a command would be considered sub-commands. These sub-commands are also identified using the lexical analyzer, which can be used to differentiate the sub-commands from data values and other non-commands.

At step 502 the one or more sub-commands are parsed using the lexical analyzer to identify one or more sub-components of the one or more sub-commands. At step 503 the one or more sub-components are stored as nodes under one or more nodes corresponding to the one or more sub-commands. As indicated in step 504, this process can optionally be repeated with each sub-component of the sub-command (to identify sub-sub-commands and so on). The process can repeat until there are no more identified sub-commands.

As discussed earlier, the lexical analyzer can be implemented as one or more systolic arrays. The systolic arrays can be configured so that all components and sub-commands (and all lower level components and commands of these sub-commands) are identified during the parsing of the command without necessarily repeating the parsing process multiple times for each command. This is made possible by hard-coding the sequence of components and sub-commands used to identify each command sequentially in the systolic array. For example, a systolic array for recognizing a quadratic equation function can automatically load all components of the equation into nodes beneath the header node without having to first parse the components to identify that there is a square root function component and then parse the square root function component to identify the sub-components of the square root function component.

Figure 6:
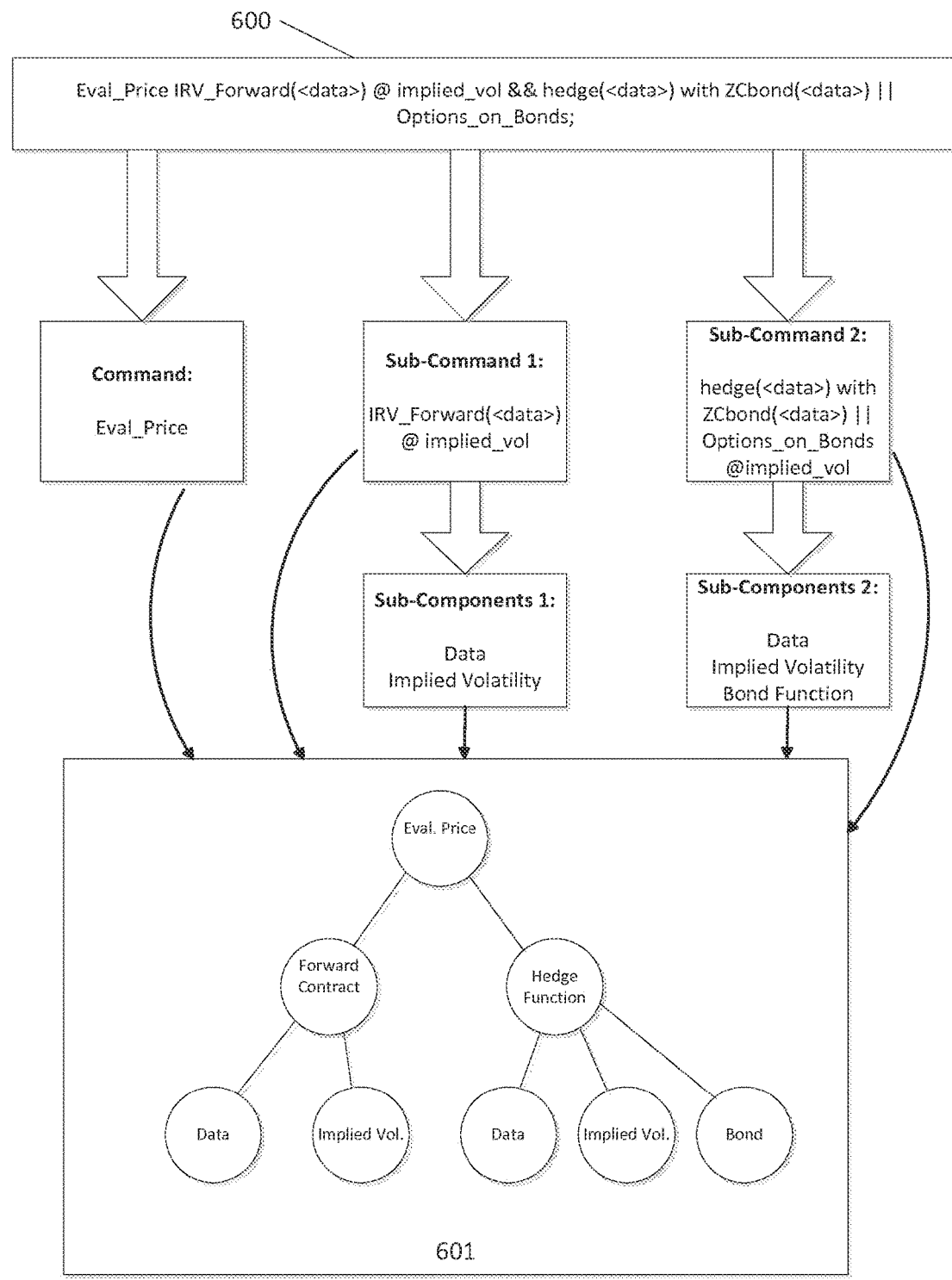
FIG. 6 is a diagram illustrating node network generation including sub-components according to an exemplary embodiment.

FIG. 6 is a diagram illustrating this node network generation including sub-components according to an exemplary embodiment. As shown in the figure, command 600 includes a first sub-command of a forward contract function and a second sub-command of a hedge function.

By parsing each of these sub-commands with the lexical analyzer, sub-components of each of the sub-commands can be identified. In this case, the forward contract function sub-command includes the sub-components of a data value (which becomes a data node) and an implied volatility function. Additionally, the hedge function sub-command includes the sub-components of a data value (which also becomes a data node), an implied volatility function, and a bond valuation function. In the case of implied volatility, the lexical analyzer can determine that the implied volatility component of the command is also applicable to the hedge function sub-command based on the specific grammar rules for the language (even though the implied volatility is not listed as an explicit operand within the hedge function). These sub-components are then added to the node network 601 for the command underneath their respective sub-commands.

Storing nodes for data values along with nodes for functions allows for subsequent dynamic binding of functions based on real-time data feeds. In the context of financial applications, the real-time data feed can take in many parameters corresponding to financial instruments (e.g., bonds, floaters, forwards, swaps, options), such as current prices, value over time, and correlations.

Figure 7:
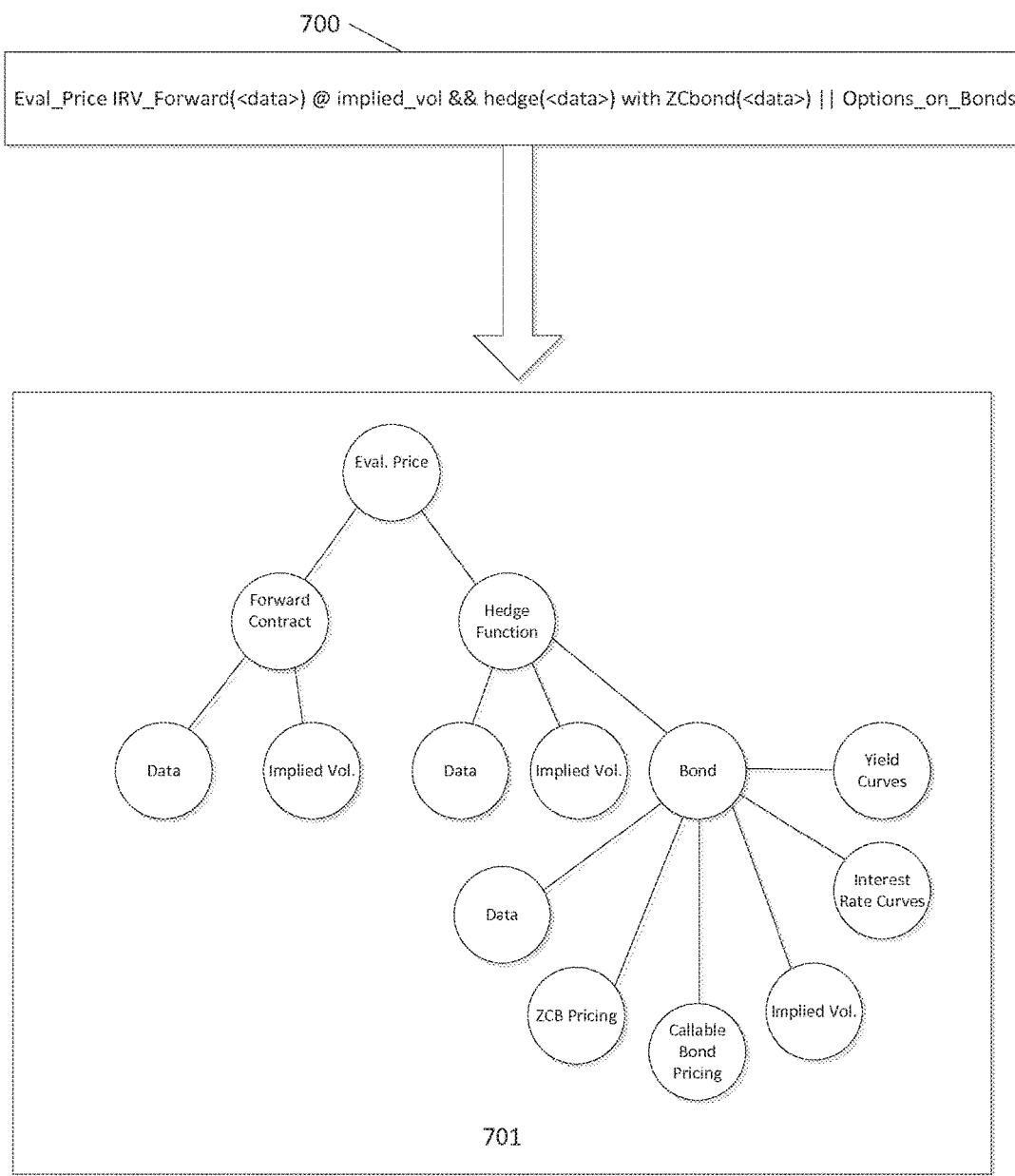
FIG. 7 is a diagram illustrating node network generation including further sub-components according to an exemplary embodiment.

FIG. 7 is a diagram illustrating node network generation including further sub-components according to an exemplary embodiment. In this example, the node network 701 corresponding to command 700 has been further expanded to include sub-components of the bond valuation function which is a sub-command of the hedge function. The particular sub-components of the bond valuation function can be based on the definition of the function in the programming language and the operators used in the command, and in this case include a data value, two different pricing methodologies (ZCB Pricing and Callable Bond Pricing), implied volatility, interest rate curves, and yield curves. Of course, the number of sub-components can be greater or fewer and can depend on the particular command or sub-command being parsed.

To summarize the node network 701 of FIG. 7, Eval Price is a header node with forward contract, hedge function and bond as sub-nodes, each pointing to the respective sub-nodes of data and implied volatility, which is determined at run time based on the relevant data value. Additionally, the bond sub-node includes the sub-nodes of interest rate curves and yield curves. As the type of the bond is decided at run time based on the relevant data value, bond also includes sub-nodes corresponding to different types of bond pricing. Thus, command line 700 is decomposed into a network of nodes 701.

Figure 8:
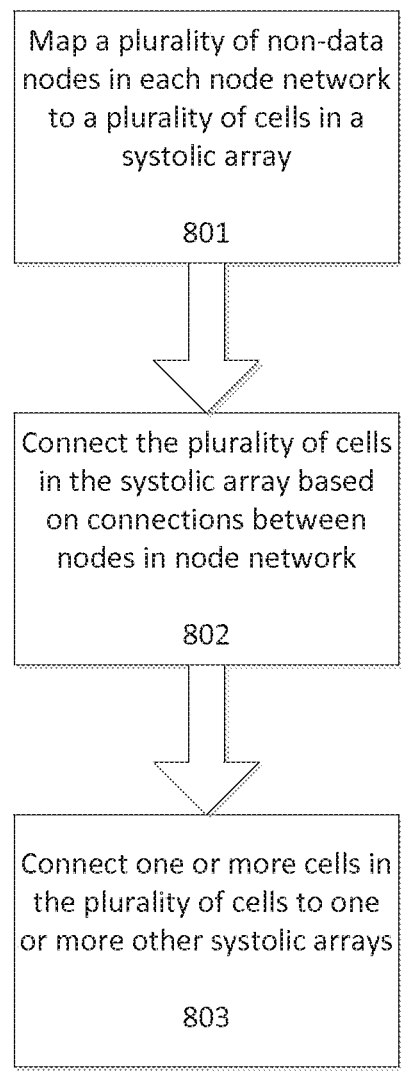
FIG. 8 illustrates a flowchart for mapping node networks to systolic arrays according to an exemplary embodiment.

FIG. 8 illustrates a flowchart for mapping node networks to systolic arrays according to an exemplary embodiment. At step 801 a plurality of non-data nodes in each node network are mapped to a plurality of cells in a systolic array. Non-data nodes include command nodes, sub-command nodes and any other nodes that do not correspond to a data value. When mapping the non-data nodes to the plurality of cells in the systolic array, one or more input ports and/or output ports can be added to at least one cell in the plurality of cells, such as for external data dependencies. The one or more ports can be added based at least in part on the language definition file corresponding to the programming language, which can specify that an additional input is received for the command or sub-command corresponding to the cell. Additionally, the ports can be added to link to other systolic arrays corresponding to a particular cell. The system allows for random access to the configurable I/O resources/ports.

Figure 9:
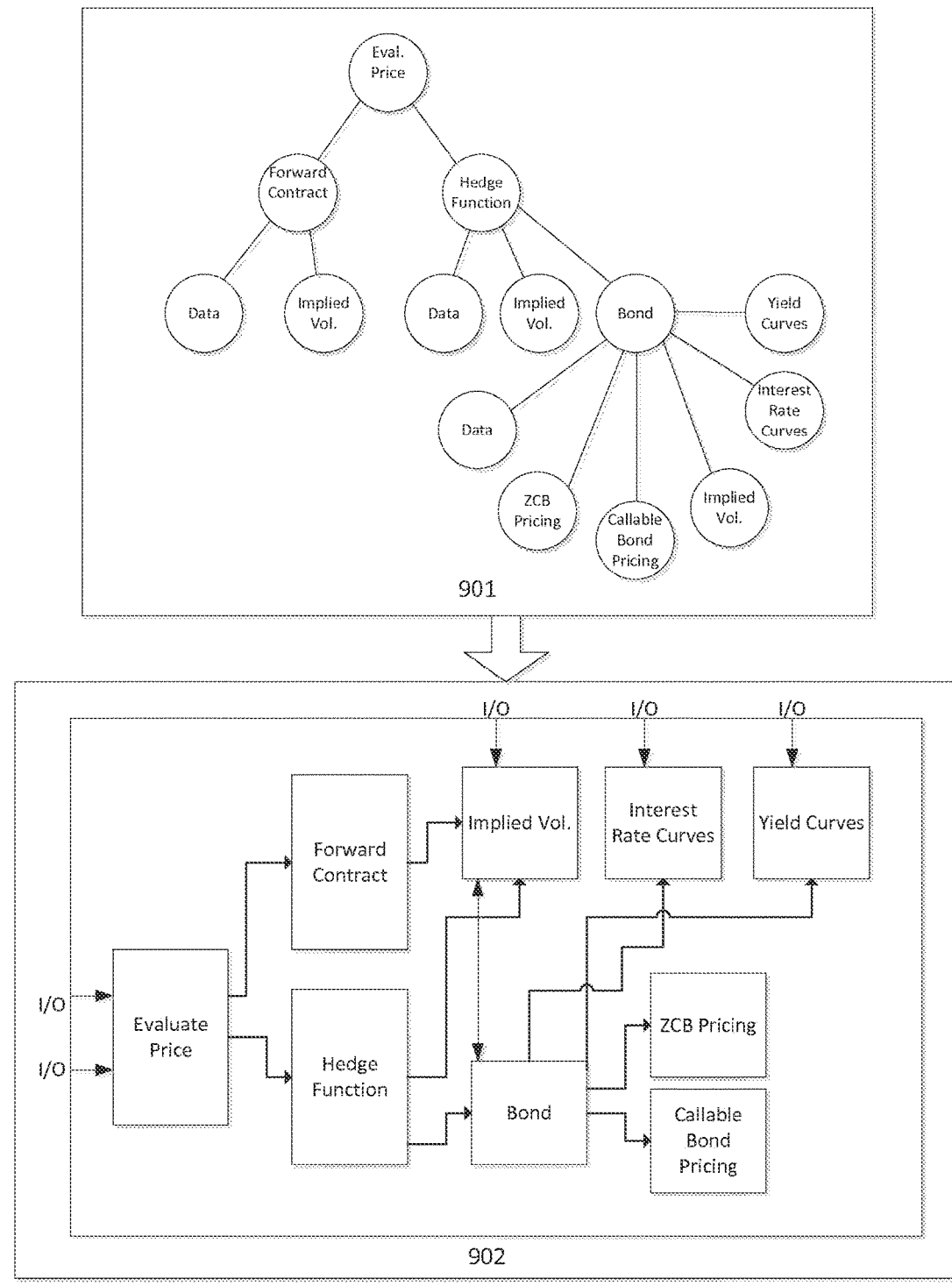
FIG. 9 is a diagram illustrating node network to systolic array mapping according to an exemplary embodiment.

FIG. 9 illustrates a mapping of a plurality of non-data nodes in node network 901 to a plurality of cells in systolic array 902. As shown in the figure, each of the non-data nodes in the node network 901 has a corresponding cell in the systolic array 902. Additionally, as shown in the figure, input/output ports have been added to the cells for evaluate price, implied volume, interest rate curves, and yield curves.

Returning to FIG. 8, at step 802, the plurality of cells in the systolic array are connected based at least in part on connections between the nodes in the node network. Additionally, a cell corresponding to a command or sub-command can be connected to one or more other cells in the plurality of cells based at least in part on a determination that output of the one or more other cells is input to the command or sub-command. This determination can be based on a language definition file corresponding to a programming language of the computer program, a user-defined function, or the program code.

Referring to FIG. 9, the plurality of cells in the systolic array 902 are connected based on the connections between the nodes the node network 901. Specifically, the execution dependencies represented as levels of the node network are used to determine the placement and direction of the connections between the cells in the systolic array. For example, since evaluate price is a parent node to forward contract and hedge function in the node network, there is a connection pointing from the evaluate price cell in the systolic array 902 to the forward contract cell in the systolic array 902 and another connection pointing from the evaluate price cell in the systolic array 902 to the hedge function cell in the systolic array 902.

Additionally, as shown in FIG. 9, the implied volatility cell in the systolic array 902 has a bidirectional connection with the bond cell in the systolic array 902. The connection pointing from the bond cell to the implied volatility cell in the systolic array 902 is based on the connections between the corresponding nodes in the node network 901. Additionally, the connection pointing from the implied volatility cell to the bond cell in the systolic array 902 can be based on a data dependency. In this case, the output of the implied volatility cell is input to the bond valuation cell so a connection from the implied volatility cell to the band valuation cell is made as well. This data dependency can be specified or based on a language definition corresponding to the programming language, a user defined function, or a component of the command or other program code. When the connections between the cells of the systolic array are mapped to computing cores, any bidirectional connections can be replaced with two unidirectional connections.

Figure 10:
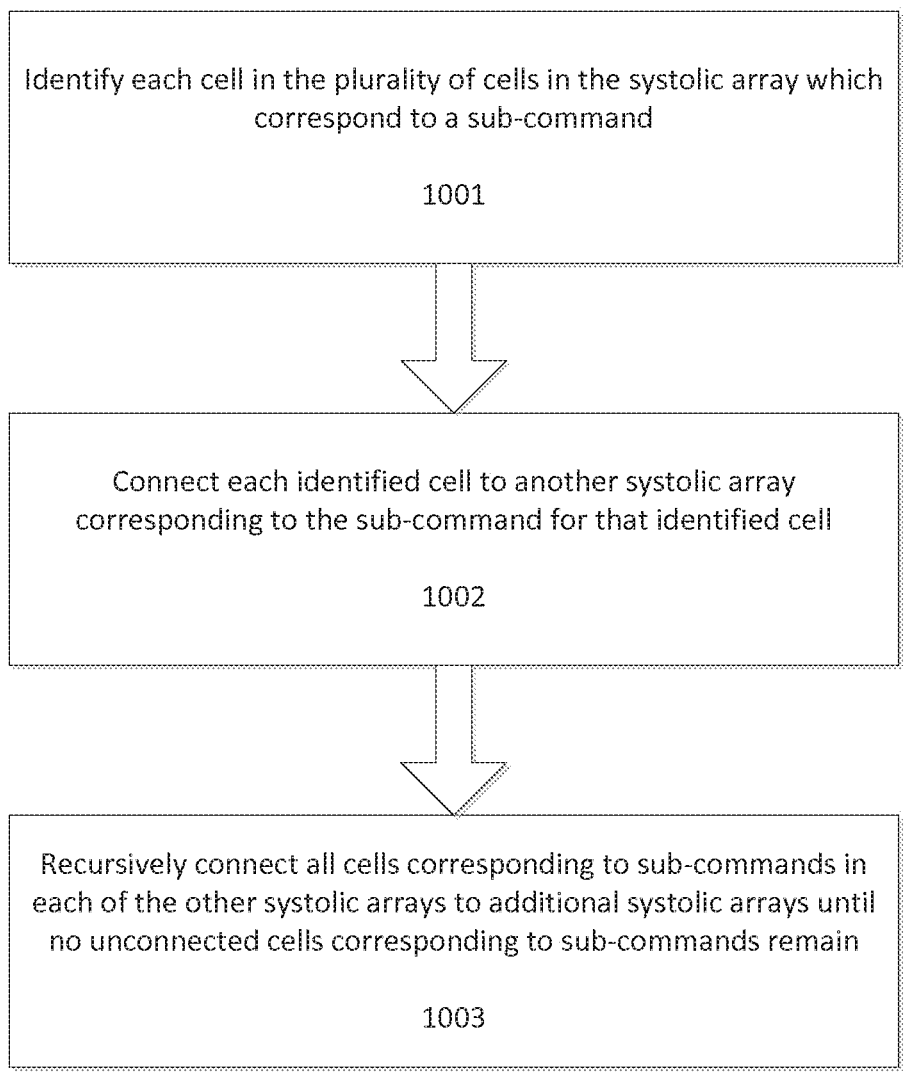
FIG. 10 illustrates a flowchart for connecting cells in a systolic array to other systolic arrays according to an exemplary embodiment.

At step 803 one or more cells in the plurality of cells are connected to one or more other systolic arrays. This step is explained in greater detail with regard to FIGS. 10-11, which are flowcharts for connecting cells in a systolic array to other systolic arrays according to an exemplary embodiment. The one or more other systolic arrays can be pre-existing systolic arrays generated previously or which correspond to library functions previously mapped to systolic arrays.

At step 1001, each cell in the plurality of cells in the systolic array which corresponds to a sub-command is identified. At step 1002, each identified cell is connected to another other systolic array corresponding to the sub-command for that identified cell. At step 1003, all cells corresponding to sub-commands in the one or more other systolic arrays are recursively connected to additional systolic arrays corresponding to the sub-commands until no unconnected cells corresponding to sub-commands remain.

Figure 11:
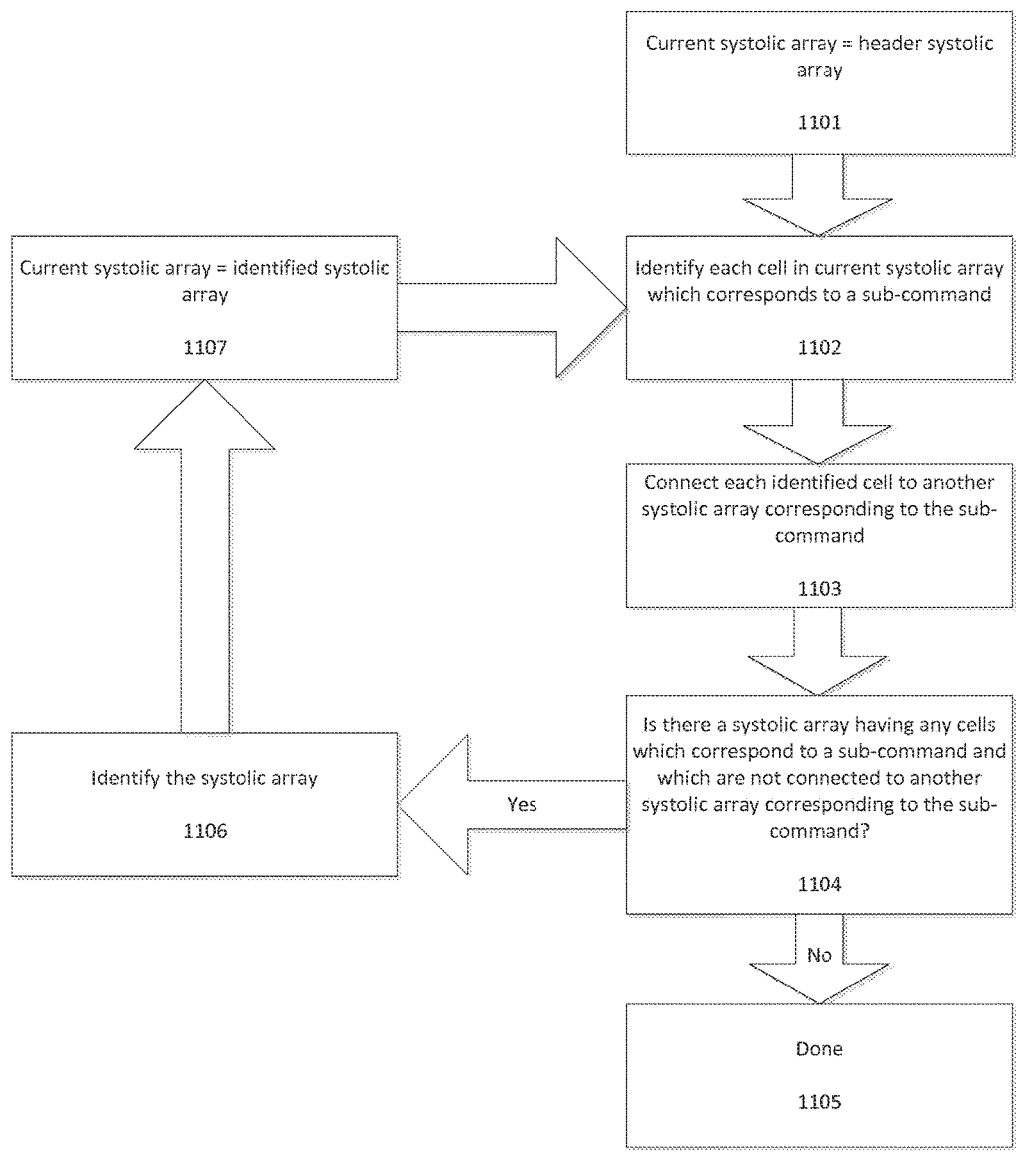
FIG. 11 illustrates another flowchart for connecting cells in a systolic array to other systolic arrays according to an exemplary embodiment.

FIG. 11 illustrates another flowchart for connecting cells in a systolic array to other systolic arrays and describes the recursive process in more detail. At step 1101, the current systolic array is set to the header systolic array. At step 1102 each cell in the current systolic array is identified which corresponds to a sub-command. At step 1103 each identified cell is connected to another systolic array corresponding to the sub-command. At step 1104 a determination is made regarding whether there is a systolic array having any cells which correspond to a sub-command and which are not connected to another systolic array corresponding to the sub-command. If the determination is false, then the process ends at step 1105. Otherwise the relevant systolic array is identified at step 1106 and the current systolic array is set to the identified systolic array at step 1107. The process then repeats starting at step 1102. The recursive process can continue until all sub-commands are eventually connected to Individual Primitive Operations, Primitive Functions, Individual dB Queries, or Individual I/O Operations.

Figure 12:
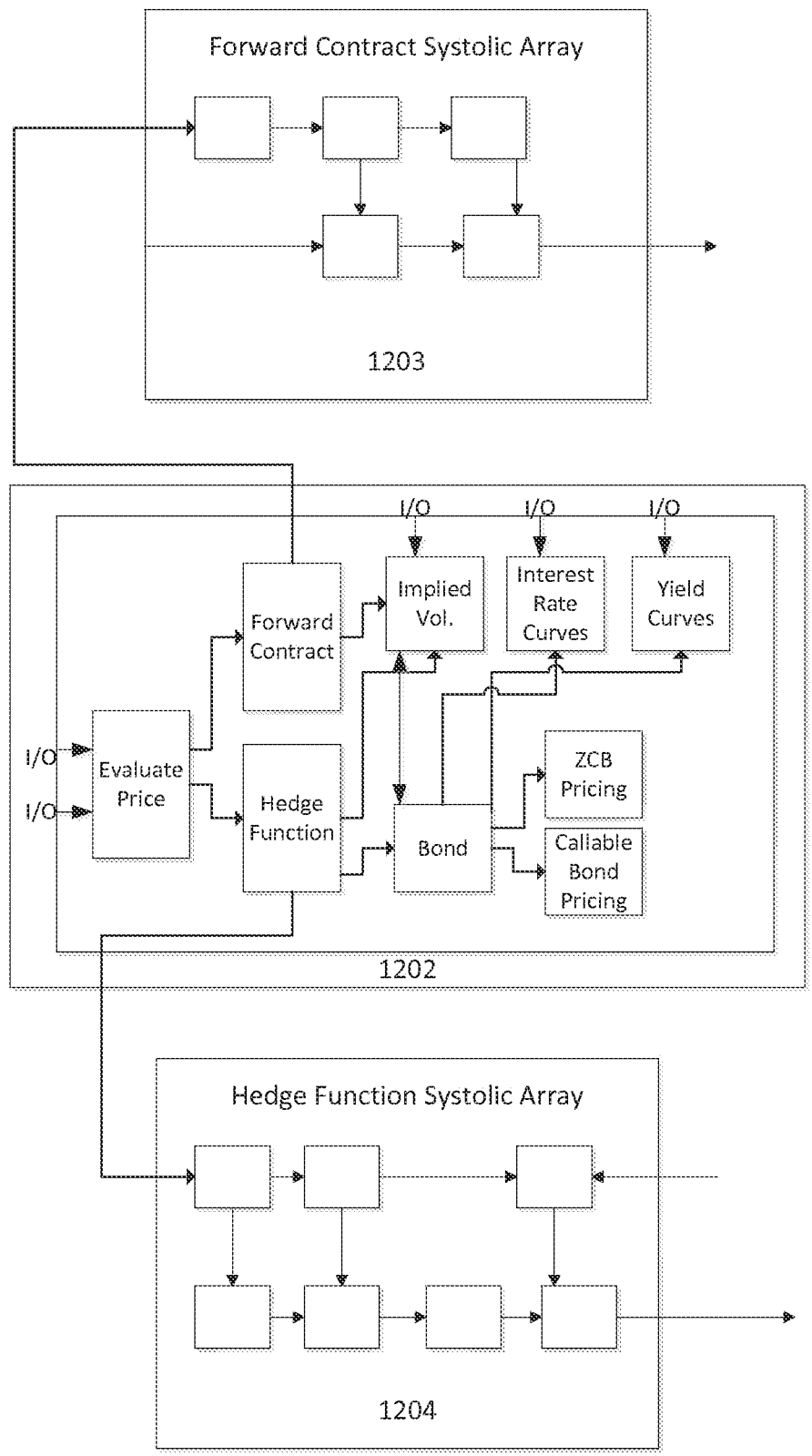
FIG. 12 is a diagram illustrating connections between cells of a systolic array and other systolic arrays according to an exemplary embodiment.

This recursive process creates a chain reaction and builds a network of interconnected systolic arrays. For example, as shown in FIG. 12, the forward contract cell of the header systolic array 1202 is connected to the forward contract systolic array 1203 and the hedge function cell of the header systolic array 1202 is connected to the hedge function systolic array 1204. Of course, this figure is presented for illustration only and does not show the complete process of connecting cells in the systolic array to other systolic arrays. In practice, the process would continue until no unconnected cells corresponding to sub-commands remained in any of the systolic arrays.

The network of interconnected systolic arrays can be used to distinguish between language specific commands, user developed application specific commands, data, and the code on which the commands are operating. The network of interconnected systolic arrays can also act as a dynamic reference data system to identify already fabricated commands on the systolic arrays.

As discussed earlier, one or more systolic arrays can be pre-existing systolic arrays generated previously or which correspond to library functions previously mapped to systolic arrays. For example, in FIG. 12 the results of pre-existing systolic arrays can be mapped to the input/output ports for the implied volatility, interest rate curves, and yield curves cells of the header systolic array. Previously fabricated systolic arrays may exist for any number of financial models and functions, such as Monte-Carlo methods and risk management models. The systolic arrays can be stored on a different core or a conventional server.

Figure 13:
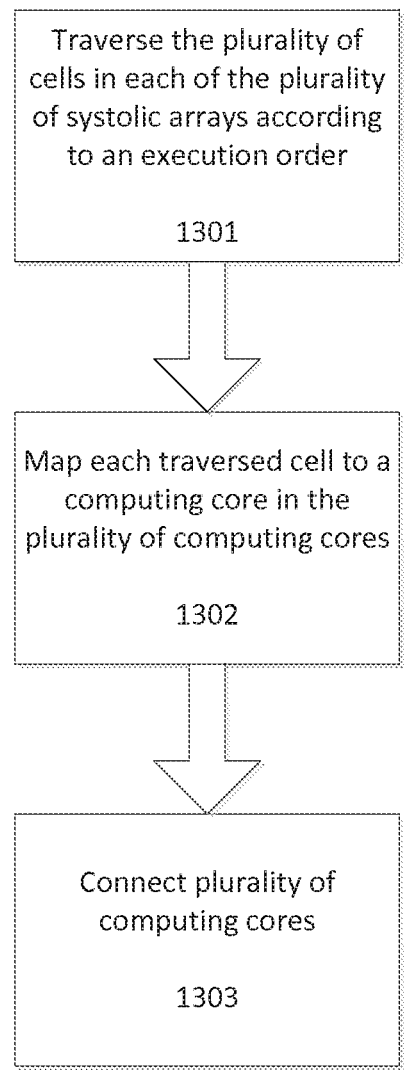
FIG. 13 illustrates a flowchart for mapping each cell in the systolic arrays to a computing core according to an exemplary embodiment.

FIG. 13 illustrates a flowchart for mapping each cell in the systolic arrays to a computing core according to an exemplary embodiment. At step 1301 the plurality of cells in each of the plurality of systolic arrays are traversed according to an execution order of the plurality of cells and the plurality of systolic arrays. At step 1302 each traversed cell is mapped to a computing core in the plurality of computing cores, wherein each traversed cell is mapped in the order of traversal.

The execution order can be the critical path, which is the longest possible execution path at run-time. By traversing the critical path and mapping the corresponding cells to computing cores, the system ensures that the computing cores will be able to compute any possible path. In the event that the execution path at run-time is shorter than the critical path, the extra computing cores corresponding to the critical path can be bypassed during execution.

Real-time parameters can be used for dynamic binding. For example, in financial applications, possible arrays of systolic cells can be created based on real-time parameters from data feeds, such as computed implied volatilities. At run time, based on the prevailing values of these parameters, the correct systolic cells can be placed in the compute path.

The system also accommodates rapid run-time reconfiguration of all possible systolic arrays offering random access to configurable resources, which in turn enables configuration controllability. In other words, the mapping of systolic array cells to computing cores can be determined dynamically at runtime, allowing for rapid placement or reconfiguration of systolic arrays, pathways, and pipelines on the reconfigurable computing cores. If any parameter is changed in the code or if command parameters in the feedback loop are changed, the same systolic array can execute with the new parameters, giving results at wire speeds.

Figure 14:
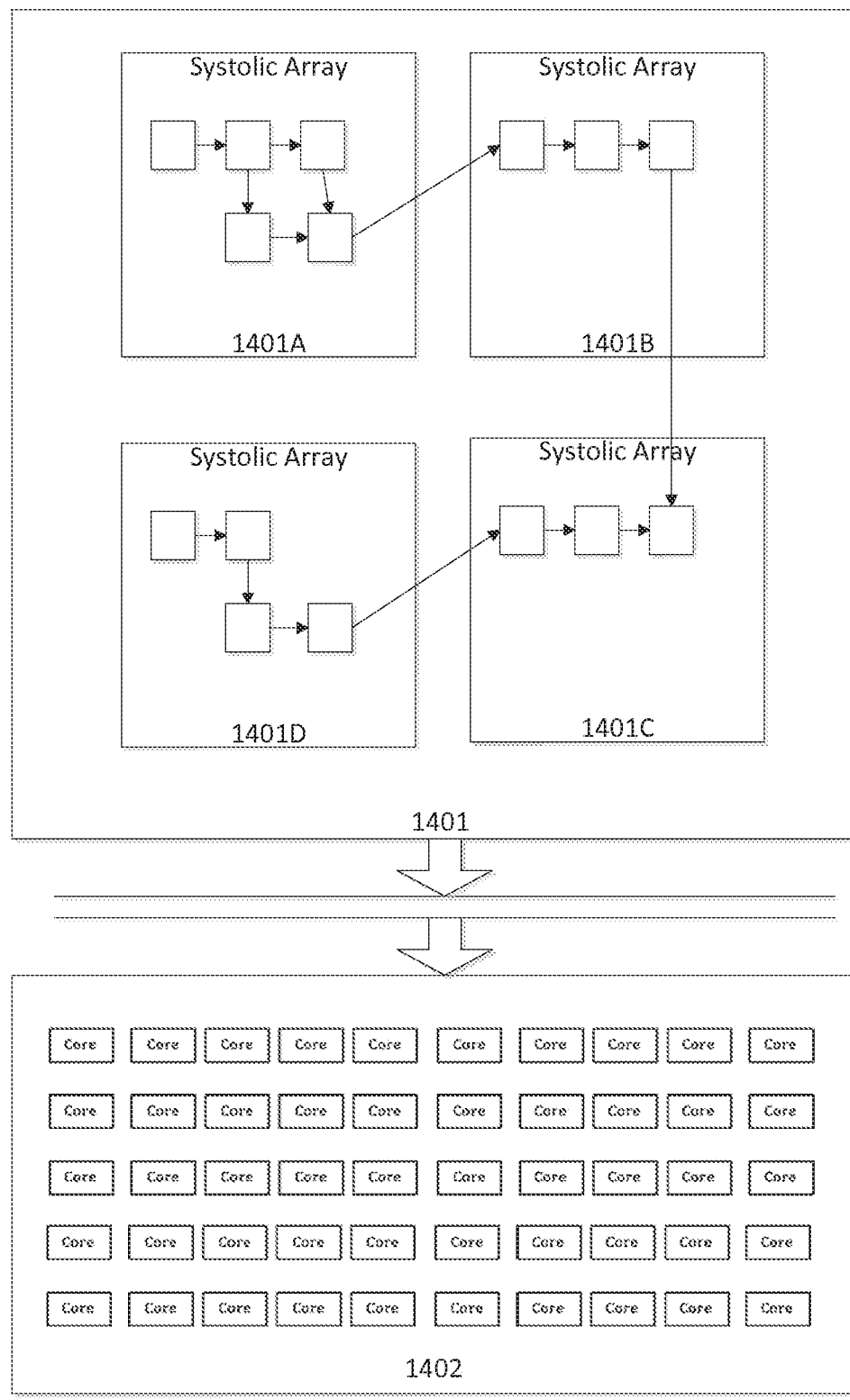
FIG. 14 is a diagram illustrating the mapping of cells in the systolic arrays to computing cores according to an exemplary embodiment.

FIG. 14 is a diagram illustrating the mapping of cells in the systolic arrays 1401 to computing cores according to an exemplary embodiment. As shown in the figure, an execution order is determined as execution proceeds through each of the cells of each of systolic arrays 1401A, 1401B, 1401C, and 1401D. By proceeding in the execution order, all dependencies in the systolic arrays are captured and mapped to the corresponding computing cores in sequence. The interconnectivities between each of the computing cores can be routed through a network connector, as is described further below.

In the event that a systolic array contains a conditional statement, whether in the form of a loop or otherwise, or a command that is dependent on some run-time parameter, all possible contingencies (including cells in the systolic array that may or may not be executed) are mapped to the computing cores along with run-time instructions on one of the computing cores to select a path at runtime based on the value of data at runtime.

By dynamically binding options at execution time, the system retains maximum flexibility without sacrificing performance. Additionally, the computing cores are able to self-steer based on data values at the time of execution.

Figure 15:
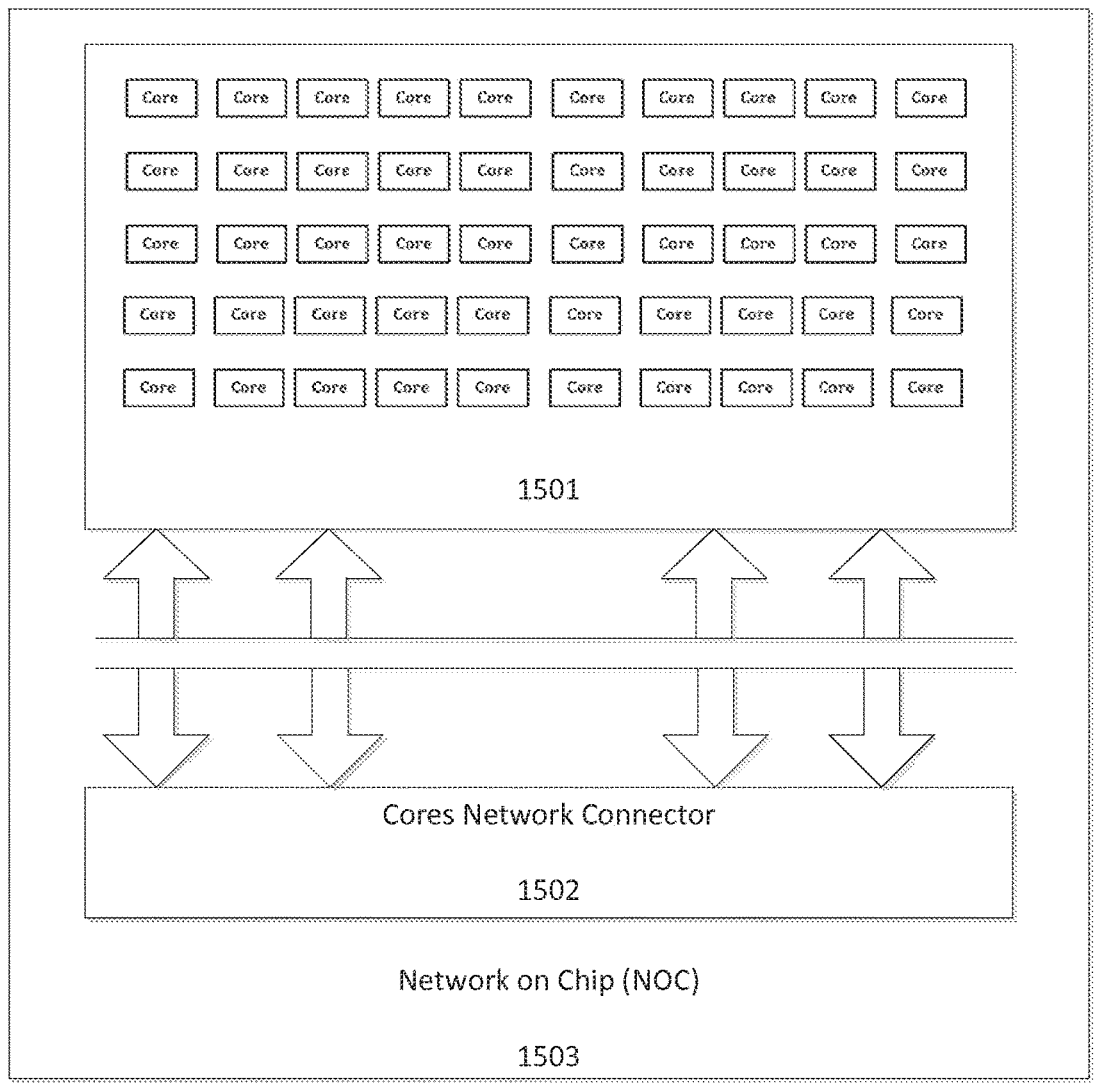
FIG. 15 is a diagram illustrating a core network on chip including computing cores and a cores network connector according to an exemplary embodiment.

Referring to FIG. 13, at step 1303 the plurality of computing cores are interconnected. FIG. 15 illustrates this interconnection. The interconnectivity between the plurality of computing cores 1501 is routed through a network connector 1502, resulting in a network on chip 1503 so that all computing cores are connected with one another. Additionally, the routing of the cores corresponding to the systolic arrays can be optimized to have a minimal amount of communication delays on the networks of cores. For example, interconnected systolic arrays can be place on the same chip so as to avoid unnecessary delays associated with inter-chip signaling. At this point the program can be executed on hardware with a high degree of parallelization using the plurality of computing cores.

Thus, this fully interconnected network of systolic arrays can execute its own primitive operations simultaneously in clock pulse, achieving wire speed execution of metrics such as price evaluation of interest rate variance forward contracts with proper hedging and either with zero coupon bonds or with options on bonds. As each systolic array can be pipelined and parallel computed within the network, the computation rate is very high. Additionally, the several systolic array networks are run concurrently, resulting in a tremendous amount of computing power being achieved at every trailing edge of the clock.

Additionally, if a new program is loaded, or the program is loaded with different run-time parameters, then the process can be repeated and the computing cores can be reconfigured.

As discussed earlier, the plurality of computing cores can be on one or more field-programmable gate arrays (FPGAs). In this situation, mapping each cell in each systolic array can comprise configuring a core on an FPGA in the one or more of FPGAs to correspond to the logic of the cell.

Figure 16A:
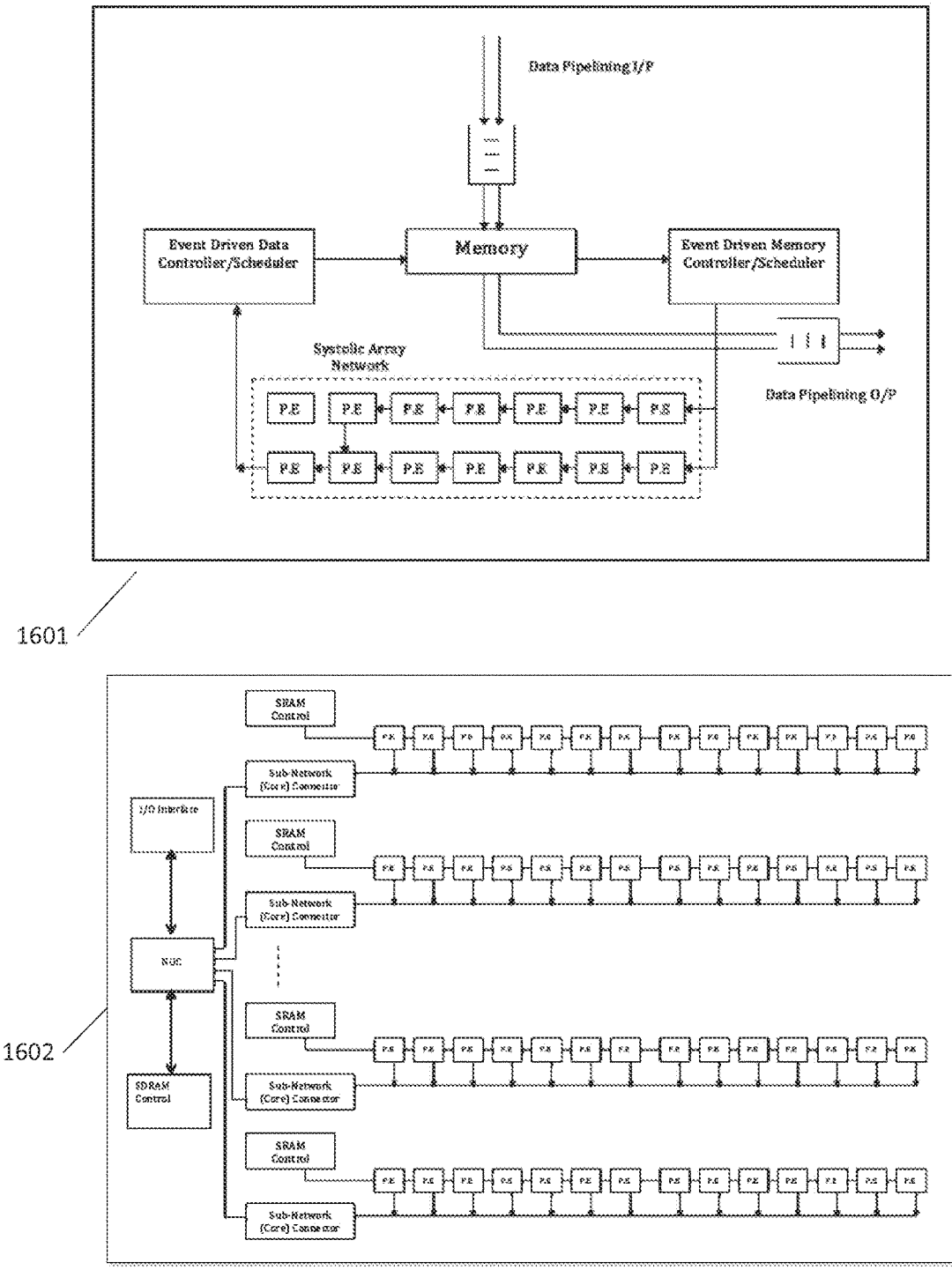
FIGS. 16A-16B illustrate three diagrams of the system implemented on a FGPA according to an exemplary embodiment.
Figure 16B:
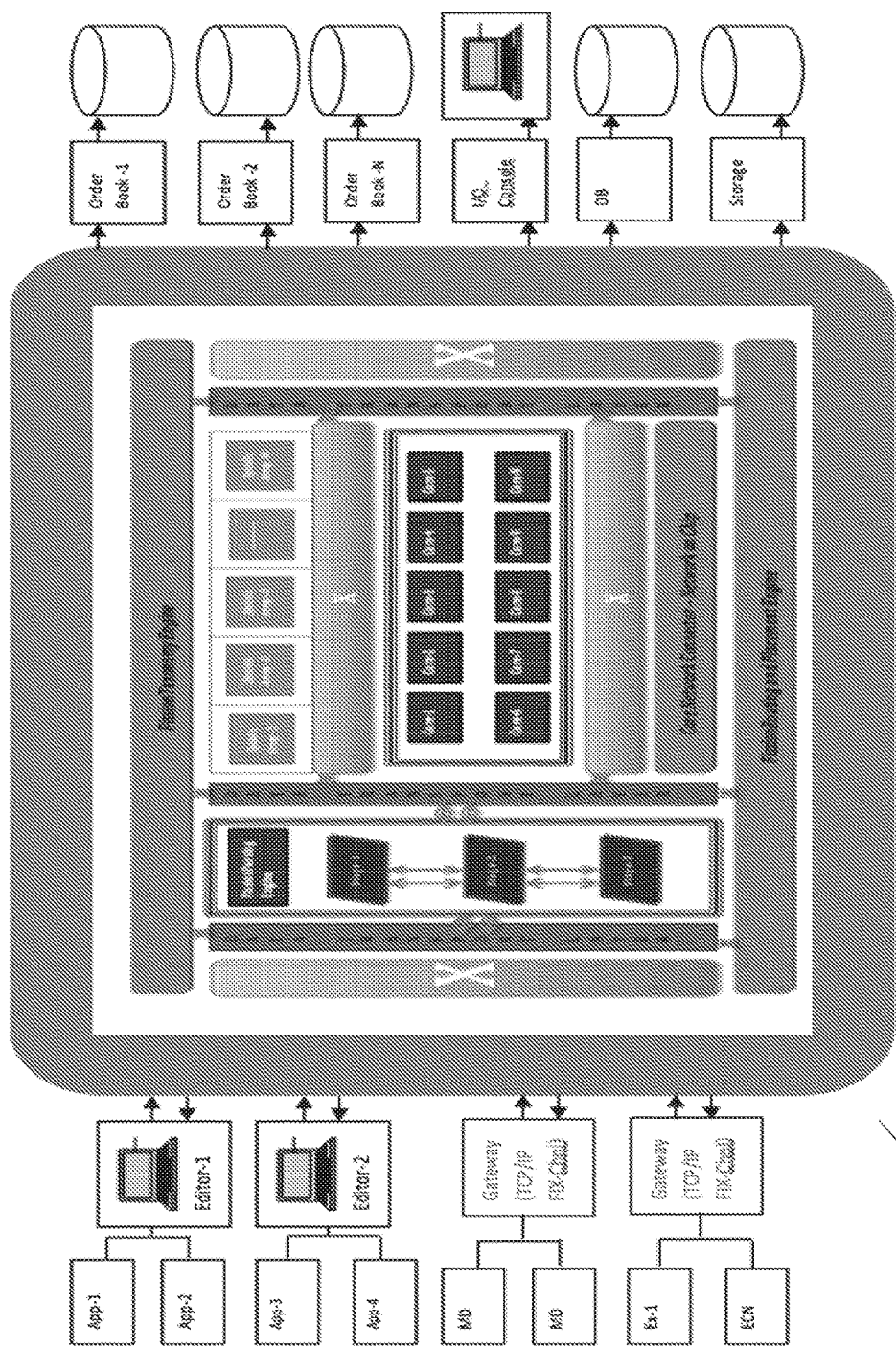

For example, FIG. 16A illustrates a systolic array network formed as a set of cores on some of the cores on an FPGA 1601. Each core is represented as processing elements (P.E.) and can include an arithmetic logic unit, registers, memory, and a control unit. FIG. 16A also illustrates an example of the overall hardware design 1602 of the NOC including interconnected cores created on a FPGA. FIG. 16B illustrates an example of the system architecture 1603 when implemented in the context of trading and/or financial analysis platform.

Figure 17:
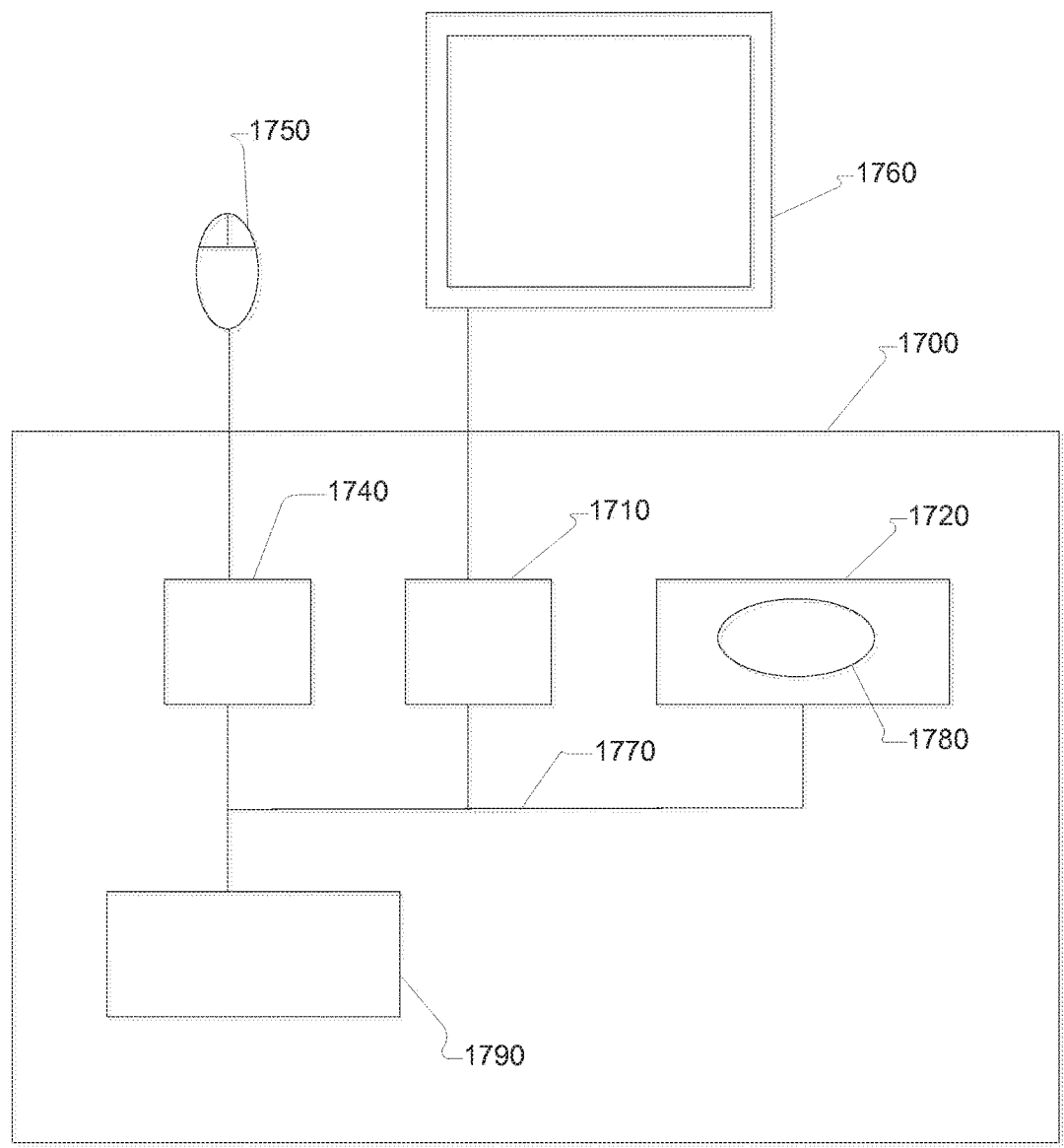
FIG. 17 illustrates an exemplary computing environment that can be used to carry out the method for parallelization of a computer program on a plurality of computing cores according to an exemplary embodiment.

One or more of the above-described techniques can be implemented in or involve one or more computer systems. FIG. 17 illustrates a generalized example of a computing environment 1700. The computing environment 1700 is not intended to suggest any limitation as to scope of use or functionality of a described embodiment.

With reference to FIG. 17, the computing environment 1700 includes at least one processing unit 1710 and memory 1720. The processing unit 1710 executes computer-executable instructions and may be a real or a virtual processor. In a multi-processing system, multiple processing units execute computer-executable instructions to increase processing power. The memory 1720 may be volatile memory (e.g., registers, cache, RAM), non-volatile memory (e.g., ROM, EEPROM, flash memory, etc.), or some combination of the two. The memory 1720 may store software instructions 1780 for implementing the described techniques when executed by one or more processors. Memory 1720 can be one memory device or multiple memory devices.

A computing environment may have additional features. For example, the computing environment 1700 includes storage 1740, one or more input devices 1750, one or more output devices 1760, and one or more communication connections 1790. An interconnection mechanism 1770, such as a bus, controller, or network interconnects the components of the computing environment 1700. Typically, operating system software or firmware (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, CD-RWs, DVDs, or any other medium which can be used to store information and which can be accessed within the computing environment 1700. The storage 1740 may store instructions for the software 1780.

The input device(s) 1750 may be a touch input device such as a keyboard, mouse, pen, trackball, touch screen, or game controller, a voice input device, a scanning device, a digital camera, remote control, or another device that provides input to the computing environment 1700. The output device(s) 1760 may be a display, television, monitor, printer, speaker, or another device that provides output from the computing environment 1700.

The communication connection(s) 1790 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1700, computer-readable media include memory 1720, storage 1740, communication media, and combinations of any of the above.

Of course, FIG. 17 illustrates computing environment 1700, display device 1760, and input device 1750 as separate devices for ease of identification only. Computing environment 1700, display device 1760, and input device 1750 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1700 may be a set-top box, mobile device, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the disclosure and equivalents thereto.

What is claimed is:

1. A computer architecture comprising:
    a plurality of computing cores programmed to execute a plurality of commands, the commands being decomposed into a plurality of node networks whereby each node network corresponds to a command in the plurality of commands and includes one or more nodes corresponding to execution dependencies of the command, the plurality of node networks are mapped to a plurality of systolic arrays, wherein each systolic array comprises a plurality of cells and wherein nodes in each node network are mapped to a cell in the plurality of cells, each cell in each systolic array is mapped to a computing core in the plurality of computing cores;
    an input interface coupled to the plurality of computing cores, the input interface being configured to receive input data in fixed packets; and
    an output interface coupled to the plurality of computing cores and configured to transmit output data from the plurality of computing cores to an order book.

2. The computer architecture as recited in claim 1, wherein the input data is from computer trading platform.

3. The computer architecture as recited in claim 1, wherein the order book is stored as a database.

4. The computer architecture as recited in claim 2, wherein the input data is in form of IP packets.

5. The computer architecture of claim 1, wherein the nodes in the node network include data nodes, command nodes, and sub-command nodes.

6. The computer architecture of claim 1, wherein at least some of the computing cores for a systolic array are on separate devices which are coupled to one another over a network.

7. The computer architecture of claim 6, wherein the network is a cloud network.

8. The computer architecture of claim 6, wherein the separate devices are all part of a server farm.

9. The computer architecture of claim 1, wherein at least one cell in the plurality of cells corresponds to a command or sub-command and the at least one cell corresponding to the command or sub-command is connected to one or more other cells in the plurality of cells based at least in part on a determination that output of the one or more other cells is input to the command or sub-command.

10. The computer architecture of claim 9, wherein the determination that the output of one or more other nodes corresponding to the one or more other cells is input to the command or subcommand is made based on a language definition file corresponding to a programming language.

* * * * *